Feb. 1, 1966 H. B. FIELDS 3,232,816
APPARATUS FOR BONDING TRIM STRIPS TO THE SIDE
WALLS OF VEHICLE TIRES
Filed Dec. 28, 1962 2 Sheets-Sheet 1

INVENTOR...
HERBERT B. FIELDS
BY Schmieding and Fultz
ATTORNEYS

INVENTOR...
HERBERT B. FIELDS

United States Patent Office 3,232,816
Patented Feb. 1, 1966

3,232,816
APPARATUS FOR BONDING TRIM STRIPS TO
THE SIDE WALLS OF VEHICLE TIRES
Herbert B. Fields, 599 S. Burgess, Columbus 4, Ohio
Filed Dec. 28, 1962, Ser. No. 248,133
7 Claims. (Cl. 156—394)

This invention relates to apparatus for bonding trim strips to the side walls of vehicle tires.

In general the apparatus of the present invention comprises a base means for supporting a tire with a strip or ring of trim material, such as white rubber tape, positioned in overlying relationship with the black side of the tire.

If the nature of the materials requires it, a layer of bonding material is interposed between the trim and the tire.

A head means is positioned over the trim and the tire to clamp the elements together while heat is applied to the trim and tire to permanently bond the assembly together.

As one aspect of the present invention the head means is of composite construction to provide removable annular platen elements that can be selectively mounted and removed for use with various sized tires.

As another aspect of the present invention the platens are provided with vents at the trim engaging surface thereof to permit the escape of gas generated during the bonding operation.

As another aspect of the present invention the platens are arranged to substantially conform with the shape of the side of a tire thereby permitting the use of flat trim strip material.

As another aspect of the present invention the head means is provided with a built-in annular conductor positioned adjacent the platen engaging surface to the head means whereby various sized platens can be heated by a common heat source.

As another aspect of the present invention the apparatus is provided with a tire locating means that also functions as part of the mechanism for urging the head means and base means into clamped engagement with the tire.

Further objects and advantages of the present invention will be apparent from the following description, reference being had to the accompanying drawings wherein a preferred form of embodiment of the invention is clearly shown.

Figure 2:
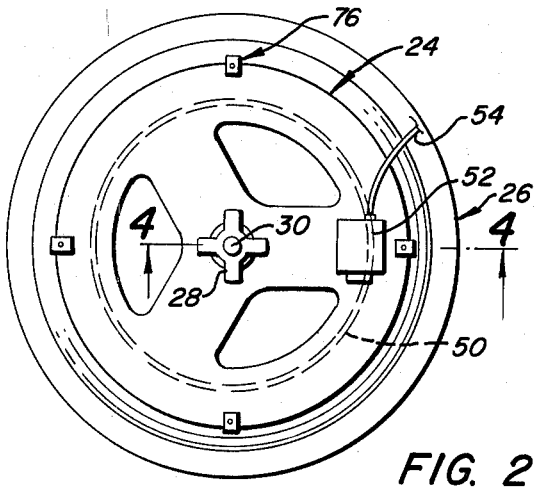
FIG. 2 is a top elevational view of the apparatus of FIG. 1.
Figure 1:
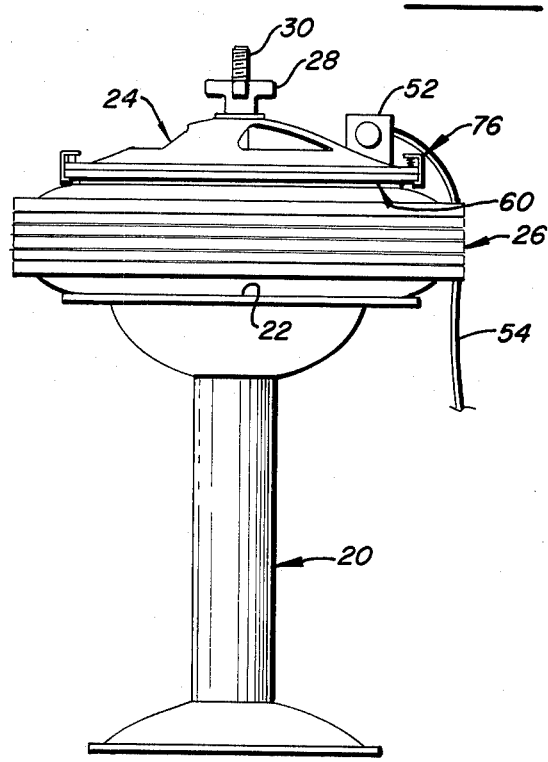
FIG. 1 is a side elevational view of an apparatus for attaching trim strips to tires, said apparatus being constructed in accordance with the present invention.

Referring in detail to the drawings, FIGS. 1 and 2 illustrate an apparatus constructed in accordance with the present invention that comprises a base means 20 which is preferably in the pedestal form illustrated and includes a first tire supporting surface 22.

A head means indicated generally at 24 is positioned over an automotive tire 26 so as to be removable by loosening the nut 28 and removing same from a rod 30.

Figure 4:
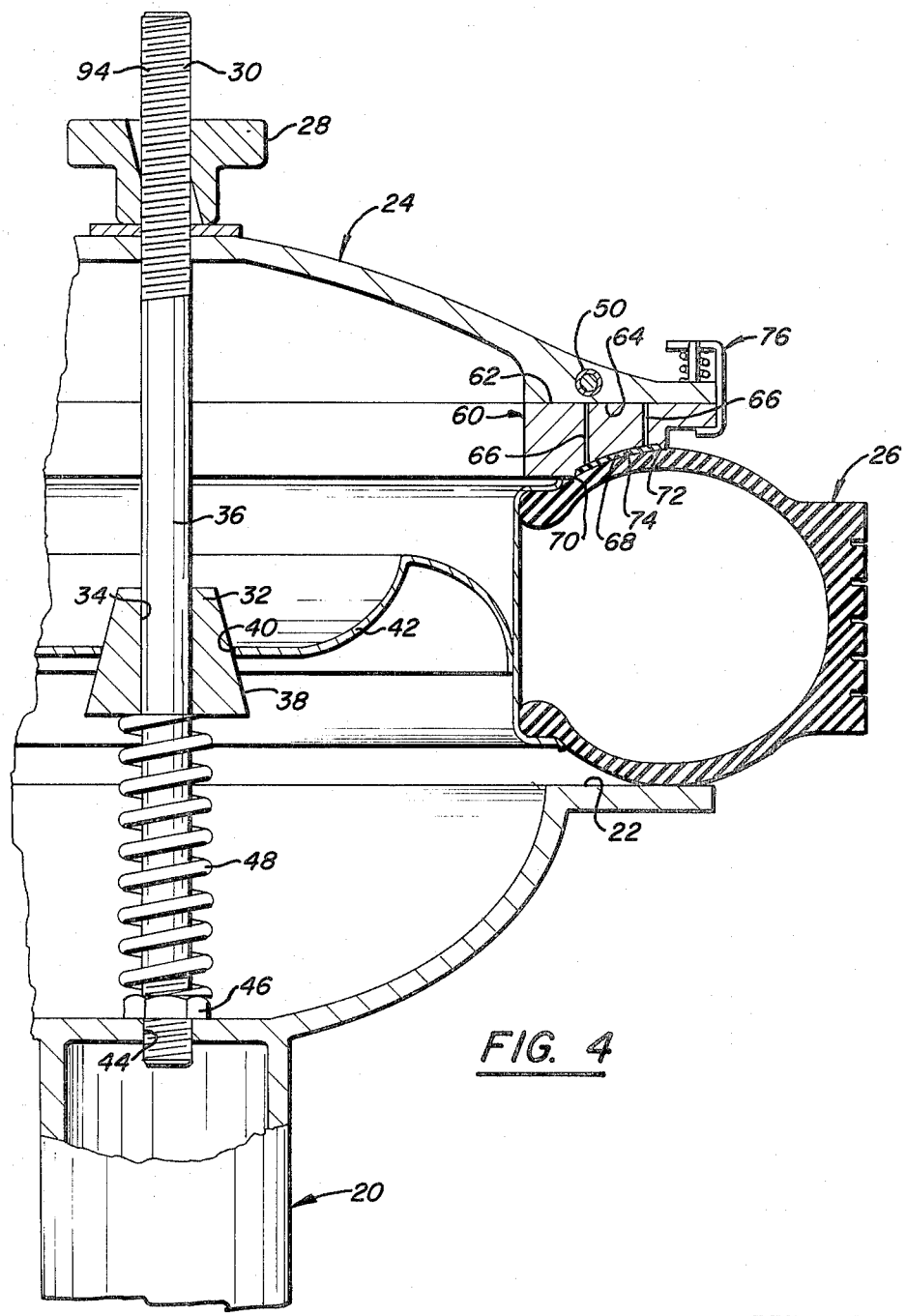
FIG. 4 is a partial side sectional view showing the internal details of the apparatus of the present invention, the section being taken along a plane through the vertical center line of the apparatus.

Referring next to FIG. 4, tire 26 is located relative to the base means and head means by a centering means or bushing 32 that includes a bore 34 slidably positioned on a guide portion 36 of rod 30.

Bushing 32 includes a tapered outer wall 38 for extension into a hole 40 of the wheel 42 on which the tire is mounted.

The lower end of the rod 30 is screwed into a hole 44 in the base means and retained therein by a lock nut 46.

A compression spring 48 yieldably supports bushing 32, said spring serving to normally raise the bushing to the highest required position for snugly fitting into any type of wheel 42.

With continued reference to FIG. 4, head means 24 comprises an annular conductor 50 which is connected to a thermostat 52, FIG. 1, the latter being in turn connected to a source of electrical energy by a cord 54.

A platen element indicated generally at 60 includes a platen surface 62 in contacting heat exchange relationship with a lower surface 62 on the head means.

As is seen in FIG. 5, platen 60 is provided with a plurality of vent passages 66 that include lower ends opening at a curved lower platen surface 68.

Any gas generated during bonding passes upwardly through vent passages 66 and outwardly through the space between surface 64 on the head means and platen surface 62.

As seen in FIG. 4, the inner and outer edges of curved platen surface 68 are provided with downwardly extending shoulders 70 and 72 which serve to confine a side wall trim strip 74 during bonding.

In order to accommodate tires of different diameter platen elements 60 are made in various corresponding sizes and are removably mounted to head means 24, in heat exchange relationship with resistor-conductor 50 by a platen mounting means or easy detaching means indicated generally at 76.

Figure 3:
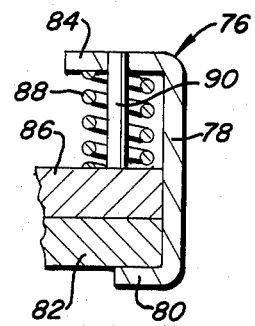
FIG. 3 is a partial view of the apparatus of the preceding figures and showing a platen clamping means comprising a portion of said apparatus.

As seen in FIG. 3, platen mounting means 76 comprises a C-shaped member 78 that includes a lower leg 80 that underlines an outer edge portion 82 of the platen and an upper leg portion 84 that overlies an upper rim portion 86 with the head means. A compression spring 88 is interposed between leg 84 and edge portion 86 and a pin 90 is positioned centrally of the spring to retain it in place.

In operation, tire 26 is positioned over tapered bushing 32 and the head means 24, with platen 60 attached by platen mounting means 24, is positioned over guide 36 with the lower curved surface 68 of the platen element in overlying confining relationship with trim strip 74.

Nut 28 is next manually screwed down on threads 94 whereby bushing 32 and spring 48 are compressed downwardly until the trim strip 74 is snugly clamped against tire 26.

Annular resistor-conductor 50 is next energized whereby platen 60 is heated by heat transfer at the confronting surfaces 62 and 64.

When a bond is completed at the confronting surfaces of the trim strip and the tire the heat is turned off and head means 24 is removed from guide 36 whereby the tire can be removed ready for use.

Trim strip 74 can be formed of rubber or synthetic rubber compositions similar to that of the tire and vulcanized to the tire or trim strip 74 can be formed of dissimilar material with a suitable bonding agent being used between the trim strip and the tire.

It should be pointed out that the trim strip 74 can either be in tape form or in annular stamped form without departing from the spirit of the present invention.

I claim:

1. An apparatus for applying sidewall strips to tires comprising, in combination, base means; head means above said base means, one of said means including centering means for positioning a wheel with a tire mounted thereon; heating means for one of said two first mentioned means; an annular platen element in heat transfer relationship with said one of said two first mentioned means whereby said platen element is heated by said heating means, said annular platen element including an annular surface for applying heat and pressure to a sidewall strip positioned on the wall of a tire; easy detaching means for removably mounting said platen element on said one of said two first mentioned means permitting selection of different platens according to the pattern of sidewall design; and pressure applying means operative between said head means and said base means for compressing said sidewall strip between said annular surface and a tire.

2. The apparatus defined in claim 1 wherein platen element comprises vent passages that include inlets at said annular surface.

3. The apparatus defined in claim 1 wherein said annular surface is curved to conform with the shape of a tire.

4. The apparatus defined in claim 1 wherein platen element comprises vent passages that include inlets at said second tire engaging surface; and wherein said annular surface is curved to conform with the shape of a tire.

5. The apparatus defined in claim 1 wherein heating means comprises an annular conductor mounted adjacent said annular surface.

6. The apparatus defined in claim 1 wherein said easy detaching means comprises a plurality of spring pressed clamps in clamped engagement with rim portions of said platen element and said one of said two first mentioned means.

7. The apparatus defined in claim 1 that includes a central rod member mounted on the center of one of said two first mentioned means and forming a guide extending into a central bore in the other of said two first mentioned means, said central rod member including a threaded end; and a threaded element on said threaded end of said central rod member for applying pressure to said other of said two first mentioned means.

References Cited by the Examiner
UNITED STATES PATENTS

| | | | |
|---|---|---|---|
| 2,031,560 | 2/1936 | Day. | |
| 2,745,137 | 5/1956 | Glynn | 18—17 |
| 2,746,515 | 5/1956 | Usack | 156—116 |
| 2,756,460 | 7/1956 | Heintz. | |
| 2,802,512 | 8/1957 | Rouse | 156—116 |
| 2,868,270 | 1/1959 | Brown | 156—394 |
| 2,895,166 | 7/1959 | MacMillan | 18—18 |
| 2,903,742 | 9/1959 | Barefoot | 18—18 |
| 3,113,902 | 12/1963 | Dismuke | 156—116 X |

EARL M. BERGERT, *Primary Examiner.*